United States Patent
Chi et al.

(10) Patent No.: US 10,841,252 B2
(45) Date of Patent: Nov. 17, 2020

(54) CONTACT MATCHING METHOD AND APPARATUS

(71) Applicant: TENCENT TECHNOLOGY (SHENZHEN) COMPANY LIMITED, Shenzhen, Guangdong (CN)

(72) Inventors: Xingde Chi, Shenzhen (CN); Lu Wang, Shenzhen (CN); Jun Ge, Shenzhen (CN); Zhehui Wu, Shenzhen (CN); Rong Li, Shenzhen (CN); He Wang, Shenzhen (CN); Congqiang Xu, Shenzhen (CN); Jian Yu, Shenzhen (CN); Qianwen Cao, Shenzhen (CN); Xiao Yuan, Shenzhen (CN); Xinwan Wu, Shenzhen (CN); Zhiwei Su, Shenzhen (CN); Jiaqi Zhuang, Shenzhen (CN); Su Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 86 days.

(21) Appl. No.: 15/692,728

(22) Filed: Aug. 31, 2017

(65) Prior Publication Data
US 2017/0366485 A1 Dec. 21, 2017

Related U.S. Application Data

(63) Continuation of application No. PCT/CN2016/083590, filed on May 27, 2016.

(30) Foreign Application Priority Data

Jun. 30, 2015 (CN) .......................... 2015 1 0375629

(51) Int. Cl.
H04L 12/58 (2006.01)
G06Q 10/10 (2012.01)

(52) U.S. Cl.
CPC ........... *H04L 51/04* (2013.01); *G06Q 10/107* (2013.01); *H04L 51/32* (2013.01)

(58) Field of Classification Search
None
See application file for complete search history.

(56) References Cited

U.S. PATENT DOCUMENTS

2005/0055450 A1* 3/2005 Gang .................. G06F 16/9535
709/228
2008/0240702 A1 10/2008 Wassingbo et al.
(Continued)

FOREIGN PATENT DOCUMENTS

| CN | 101105795 A | 1/2008 |
|---|---|---|
| CN | 102629945 A | 8/2012 |

(Continued)

OTHER PUBLICATIONS

International Search Report with Translation for International Application No. PCT/CN2016/083590 dated Aug. 29, 2016, 5 pages.

(Continued)

*Primary Examiner* — Sargon N Nano
*Assistant Examiner* — Christopher B Robinson
(74) *Attorney, Agent, or Firm* — Anova Law Group, PLLC (57) ABSTRACT

Examples of the present disclosure provide a contact matching method. The method includes: obtaining a first interest label corresponding to a contact waiting for match and a second interest label corresponding to respective contact other than the contact waiting for match in a matching interface displayed on the client device; comparing the first interest label and the second interest label to obtain at least (Continued)

one contact matching with the contact waiting for match; and displaying a first contact identifier corresponding to the contact waiting for match and a second contact identifier corresponding to respective matching contact or a second contact identifier corresponding to respective matching contact in the matching interface according to a predefined first displaying manner. Examples of the present disclosure also provide a contact matching apparatus. The solution of the present disclosure improves contact matching efficiency and accuracy.

13 Claims, 8 Drawing Sheets (56) References Cited

U.S. PATENT DOCUMENTS

| | | | |
|---|---|---|---|
| 2009/0077064 | A1 | 3/2009 | Daigle |
| 2010/0330972 | A1* | 12/2010 | Angiolillo ............ H04M 1/2746 455/418 |
| 2011/0282750 | A1* | 11/2011 | Rosen ................ G06Q 30/0267 705/14.66 |
| 2012/0271883 | A1* | 10/2012 | Montoya ................ H04W 4/21 709/204 |
| 2014/0101137 | A1 | 4/2014 | Satyanarayanan |
| 2015/0054737 | A1 | 2/2015 | Zhang et al. |
| 2015/0242497 | A1 | 8/2015 | He et al. |
| 2016/0045055 | A1 | 2/2016 | Xiang et al. |

FOREIGN PATENT DOCUMENTS

| | | |
|---|---|---|
| CN | 102867020 A | 1/2013 |
| CN | 103095884 A | 5/2013 |
| CN | 103095920 A | 5/2013 |
| CN | 103412910 A | 11/2013 |
| CN | 103810192 A | 5/2014 |
| CN | 103914559 A | 7/2014 |
| CN | 104158937 A | 11/2014 |

OTHER PUBLICATIONS

The State Intellectual Property Office of the People's Republic of China (SIPO) Office Action 2 for 201510375629.9 dated Dec. 26, 2019 7 Pages (including translation).
The State Intellectual Property Office of the People's Republic of China (SIPO) Office Action 1 for 201510375629.9 dated Sep. 29, 2019 8 Pages (including translation).

* cited by examiner

CONTACT MATCHING METHOD AND APPARATUS

CROSS-REFERENCE TO RELATED APPLICATIONS

This application is a continuation of International Application No. PCT/CN2016/083590, filed on May 27, 2016. This application claims the benefit and priority of Chinese Patent Application No. 201510375629.9, filed Jun. 30, 2015. The entire disclosures of each of the above applications are incorporated herein by reference.

FIELD OF THE DISCLOSURE

The present disclosure relates to Internet techniques, and more particularly, to a contact matching method and apparatus.

BACKGROUND OF THE DISCLOSURE

When using instant messaging applications, users usually want to communicate with contacts having similar interests with them. But conventional instant messaging applications firstly find contacts using the same instant messaging application around the user, and then select contacts from the found contacts, so as to determine contacts with similar interests with the current user, which has a low efficiency and accuracy when finding contacts.

SUMMARY OF THE DISCLOSURE

Examples of the present disclosure provide a contact matching method and an apparatus thereof, so as to solve a problem of low efficiency and low accuracy of the contact matching.

In view of the above, embodiments of the present disclosure provide a contact matching method, including:
  obtaining a first interest label corresponding to a contact waiting for match and a second interest label corresponding to respective contact other than the contact waiting for match in a matching interface;
  comparing the first interest label and the second interest label to obtain at least one contact matching with the contact waiting for match; and
  displaying a first contact identifier corresponding to the contact waiting for match and a second contact identifier corresponding to respective matching contact or a second contact identifier corresponding to respective matching contact in the matching interface according to a predefined first displaying manner.

Embodiments of the present disclosure further provide a contact matching apparatus, including:
  a processor;
  a memory coupled to the processor;
  the memory stores machine readable instructions executable by the processor to perform acts of:
  obtaining a first interest label corresponding to a contact waiting for match and a second interest label corresponding to respective contact other than the contact waiting for match in a matching interface;
  comparing the first interest label and the second interest label to obtain at least one contact matching with the contact waiting for match; and
  displaying a first contact identifier corresponding to the contact waiting for match and a second contact identifier corresponding to respective matching contact or a second contact identifier corresponding to respective matching contact in the matching interface according to a predefined first displaying manner.

Embodiments of the present disclosure further provide a non-transitory computer readable storage medium, including machine readable instructions executable by a processor to perform acts of:
  obtaining a first interest label corresponding to a contact waiting for match and a second interest label corresponding to respective contact other than the contact waiting for match in a matching interface;
  comparing the first interest label and the second interest label to obtain at least one contact matching with the contact waiting for match; and
  displaying a first contact identifier corresponding to the contact waiting for match and a second contact identifier corresponding to respective matching contact or a second contact identifier corresponding to respective matching contact in the matching interface according to a predefined first displaying manner.

According to the contact matching method provided by the present disclosure, a first interest label corresponding to a contact waiting for match in the matching interface and a second interest label corresponding to respective contact other than the contact waiting for match in the matching interface are obtained, the first interest label is compared with the second interest label to obtain a contact matching with the contact waiting for match. Through the matching of the interest labels, it is possible to find a contact matching with the contact waiting for match rapidly and improve the accuracy for contact matching. At the same time, the first contact identifier corresponding to the contact waiting for match and a second contact identifier corresponding to respective matching contact are displayed in a predefined first displaying manner, or the second contact identifier corresponding to respective matching contact is displayed in the predefined first displaying manner, which enables the user to recognize the second contact identifier corresponding to the matching contact matching with the contact waiting for match and improves a matching efficiency.

Hereinafter, the present disclosure is described in further detail with reference to accompanying drawings to make the technical solution clear.

DETAILED DESCRIPTION OF THE DISCLOSURE

It is apparent that the following are merely some examples and do not form all examples of the present disclosure.

The solution provided by examples of the present disclosure is as follows: obtaining a first interest label corresponding to a contact waiting for match and a second interest label corresponding to respective contact other than the contact waiting for match in a matching interface; comparing the first interest label and the second interest label to obtain a matching contact matching with the contact waiting for match; and displaying a first contact identifier corresponding to the contact waiting for match and a second contact identifier corresponding to the matching contact in a predefined first displaying manner; or displaying a second contact identifier corresponding to the matching contact in the predefined first displaying manner, so as to increase the contact matching efficiency and accuracy. The predefined first displaying manner is different from a displaying manner of contacts not matching with the contact waiting for match.

In conventional contact matching procedure, the user is merely able to firstly find contacts using the same instant messaging application around the user and then select a contact having similar interests from the found contacts, which leads to a low matching efficiency and accuracy.

Examples of the present disclosure provide a contact matching apparatus, which obtains a matching contact directly based on interest labels and thus has a high accuracy. At the same time, the first contact identifier of the contact waiting for match and the second contact identifier corresponding to respective matching contact are displayed in the predefined first displaying manner, or respective second contact identifier of the matching contact is displayed in the predefined first displaying manner, which facilitates the user to recognize the second contact identifier of the matching contact, and increases the contact matching efficiency.

The contact matching apparatus provided by the present disclosure may be deployed in a PC, or other electronic terminals capable of running an instant messaging application or a social networking application, such as cell phone, tablet computer, etc. The hardware structure of the contact matching apparatus may be as shown in FIG. 1.

Figure 1:
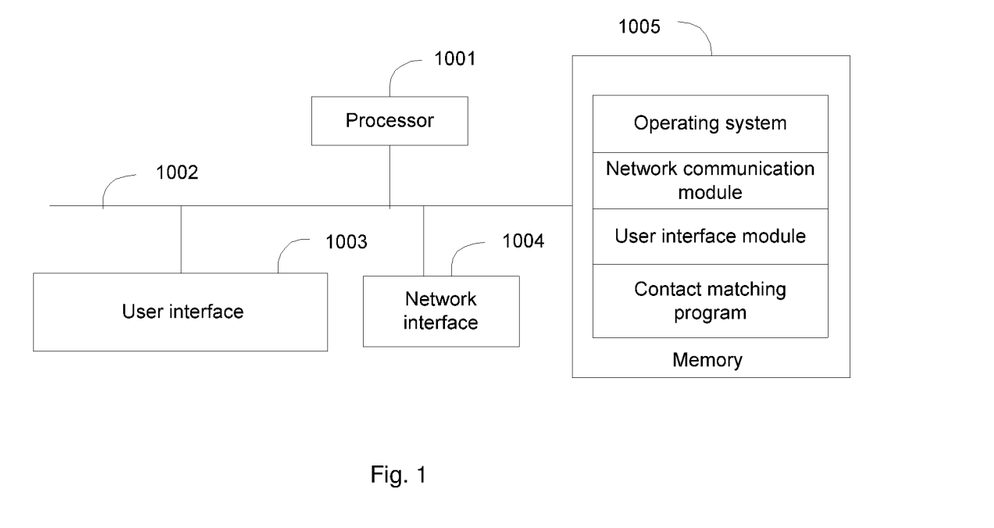
FIG. 1 is a schematic diagram illustrating a hardware structure related to a contact matching apparatus provided by various examples of the present disclosure.
Figure 2:
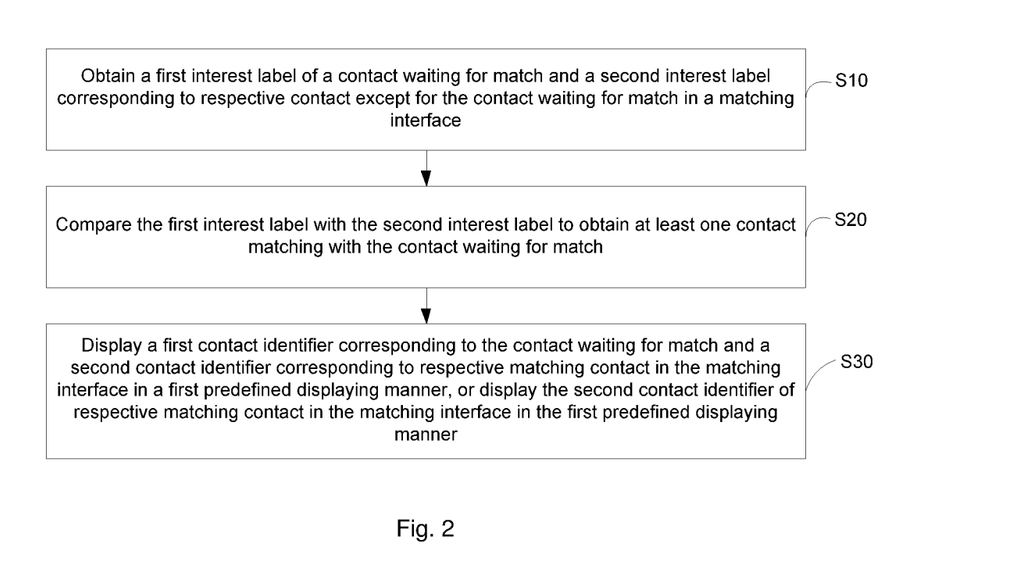
FIG. 2 is a flowchart illustrating a contact matching method according to various examples of the present disclosure.

FIG. 1 shows a hardware structure of the contact matching apparatus according to various examples of the present disclosure. As shown in FIG. 1, the contact matching apparatus includes: a processor 1001, e.g., CPU, a network interface 1004, a user interface 1003, a memory 1005 and a communication bus 1002. The communication bus 1002 is used for implementing communications of components of the contact matching apparatus. The user interface 1003 may include components such as display, keyboard and mouse, for receiving information input by a user and transmitting the received information to the processor 1005 for processing. The display may be a LCD screen, LED screen, or a touch screen, for displaying data to be displayed by the contact matching apparatus, e.g., an operating interface for contact matching. In some examples, the user interface 1003 may further include a wired interface or a wireless interface. In some examples, the network interface 1004 may include a wired interface, or a wireless interface (e.g. WiFi interface). The memory 1005 may be a high speed RAM or a non-volatile memory, e.g., disk. In some examples, the memory 1005 may be a storage apparatus independent from the processor 1001. As shown in FIG. 2, acting as a computer storage medium, the memory 1005 may include an operating system, a network communication module, a user interface module and a contact matching program.

In the hardware of the contact matching apparatus as shown in FIG. 1, the network interface 1004 is mainly used for implementing communication with an application platform and having data communications with the application platform. The user interface 1003 is mainly for implementing communication with a client device, having data communications with the client device, and receiving information and instructions input by the client device. The processor 1001 may execute the contact matching program stored in the memory 1005 to perform the acts of:

obtaining a first interest label corresponding to the contact waiting for match and a second interest label corresponding to respective contact other than the contact waiting for match in a matching interface;

comparing the first interest label and the second interest label to obtain at least one matching contact matching with the contact waiting for match;

displaying in the matching interface a first contact identifier corresponding to the contact waiting for match and a second contact identifier corresponding to respective matching contact in a predefined first displaying manner, or displaying a second contact identifier corresponding to respective matching contact in the matching interface according to the predefined first displaying manner.

In some examples, the matching interface may be displayed when a group chat button is clicked. The contact identifier of each contact in the group chat is displayed on the matching interface. Further, in some examples, the processor 1001 executes the contact matching program stored in the memory 1005 to perform acts of:

determining whether there are multiple matching contacts matching with the contact waiting for match;

when there are multiple matching contacts matching with the contact waiting for match, obtaining first position information of the first contact identifier corresponding to the contact waiting for match in the matching interface and second position information of the second contact identifier of respective matching contact in the matching interface;

determining a second contact identifier closest to the first contact identifier according to the first position information and the second position information; and displaying in the matching interface the first contact identifier and the second contact identifier closest to the first contact identifier in the predefined first displaying manner, or displaying the second contact identifier closest to the first contact identifier in the matching interface according to the predefined first displaying manner.

In some examples, the processor 1001 executes the contact matching program stored in the memory to perform acts of:
  determining whether there are multiple matching contacts matching with the contact waiting for match;
  when there are multiple matching contacts matching with the contact waiting for match, obtaining first position information of the first contact identifier corresponding to the contact waiting for match in the matching interface and second position information of the second contact identifier of respective matching contact in the matching interface;
  determining a second contact identifier within a predefined threshold distance away from the first contact identifier according to the first position information and the second position information; and
  displaying in the matching interface the first contact identifier and the second contact identifier within the predefined threshold distance away from the first contact identifier in the predefined first displaying manner, or displaying the second contact identifier within the predefined threshold distance away from the first contact identifier in the matching interface according to the predefined first displaying manner.

In some examples, the processor 1001 executes the contact matching program stored in the memory 1005 to perform acts of:
  obtaining, in real time or at a predefined time, the first position information of the first contact identifier in the matching interface and the second position information of respective second contact identifier in the matching interface; wherein the contact identifier is moveable in the matching interface under control of a corresponding contact;
  determining a distance between the first contact identifier and the second contact identifier according to the first position information and the second position information; and
  when the distance is smaller than a predefined threshold, displaying a consistent interest element between the first contact identifier and the second contact identifier according to a predefined second displaying manner.

In some examples, the processor 1001 executes the contact matching program stored in the memory 1005 to perform acts of:
  when receiving a trigger event associated with the second contact identifier, displaying a chatting interface between the contact waiting for match and the matching contact corresponding to the second contact identifier.

In some examples, the processor 1001 executes the contact matching program stored in the memory 1005 to perform acts of:
  comparing respective interest element in the first interest label and respective interest element in the second interest label to determine a matching degree between the first interest label and the second interest label; and
  determining the matching contact matching with the contact waiting for match according to the matching degree; wherein the matching degree corresponding to the second interest label of the matching contact is higher than a predefined threshold.

In some examples, the processor 1001 executes the contact matching program stored in the memory 1005 to perform acts of:
  determining the contact waiting for match;
  the determining the contact waiting for match includes:
    determining a contact triggering a matching instruction as the contact waiting for match; or determining a contact whose contact identifier entering to the matching interface as the contact waiting for match; or determining a contact whose contact identifier entering into a predefined area of the matching interface as the contact waiting for match.

According to the above solution provided by the examples of the present disclosure, it is possible to directly find the matching contact according to the interest label. Thus, the matching accuracy is high. At the same time, the first contact identifier corresponding to the contact waiting for match and the second contact identifier corresponding to respective matching contact are displayed according to the predefined first displaying manner, or the second contact identifier corresponding to respective matching contact is displayed in the predefined first displaying manner. Thus, the user is facilitated to recognize the second contact identifier corresponding to the matching contact, which improves contact matching efficiency.

Based on the above hardware structure, examples of the present disclosure provide a contact matching method.

As shown in FIG. 2, examples of the present disclosure provide a contact matching method. In some examples, the contact matching method is executed by a client device capable of running an instant messaging application or a social networking application, such as a cell phone, tablet computer, etc. The contact matching method includes the following.

In block S10, a first interest label of a contact waiting for match and a second interest label corresponding to respective contact except for the contact waiting for match in a matching interface are obtained.

In some examples, before block S10, it is required to determine the contact waiting for match firstly. It is possible to determine a contact triggering a matching instruction as the contact waiting for match when the contact. Or, it is possible to determine a contact as the contact waiting for match when a contact identifier corresponding to the contact enters into the matching interface. Or, it is possible to determine a contact as the contact waiting for match when a contact identifier corresponding to the contact enters into a particular area of the matching interface.

The user may input an interest label in an interest label input interface. Interest element(s) in the interest label may be input by the user or selected from various keywords. For example, the interest elements included in the interest label corresponding to the contact waiting for match may include: basketball, climbing and badminton. The interest label may also be configured when the user applies for an instant messaging account or a social networking account.

The interest label corresponding to each contact is saved in association with contact information of the contact, e.g., the interest label of each contact can be obtained according to a mapping relationship between the interest label and the contact information.

In block S20, the first interest label is compared with the second interest label to obtain at least one contact matching with the contact waiting for match.

Figure 3:
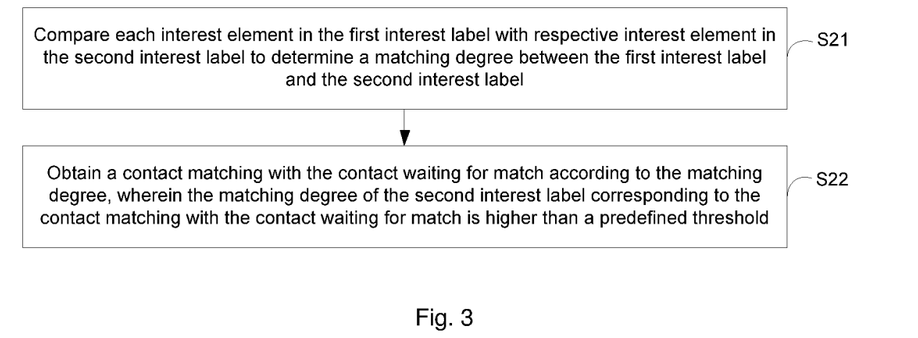
FIG. 3 is a flowchart illustrating block 20 in FIG. 1 according to various examples of the present disclosure.

In some examples, each interest element of the first interest label may be compared with that of the second interest label, so as to determining a matching degree. As shown in FIG. 3, in some examples, block S20 may include the following.

In block S21, each interest element in the first interest label is compared with respective interest element in the second interest label to determine a matching degree between the first interest label and the second interest label.

In some examples of the present disclosure, the matching degree is a proportion of the number of consistent interest element(s) between the first interest label and the second interest label to the total number of interest element(s) of the first interest label. For example, the number of interest elements of the first interest label is 5, and the number of consistent interest elements between the first interest label and the second interest label is 3. Thus, the matching degree of the second interest label is 60%.

It should be noted that, the matching degree may also be the number of the interest element(s) of the second interest label that are consistent with the first interest label. For example, the number of interest elements of the second interest label that are consistent with the first interest label is 3. Thus, the matching degree corresponding to the second interest label is 3.

In block S22, a contact matching with the contact waiting for match is obtained according to the matching degree, wherein the matching degree of the second interest label corresponding to the contact matching with the contact waiting for match is higher than a predefined threshold.

The predefined threshold may be defined by a user or may be a default value configured by system. If the matching degree corresponding to the second interest label is higher than the predefined threshold, it is determined that the contact corresponding to the second interest label matches with the contact waiting for match.

In block S30, a first contact identifier corresponding to the contact waiting for match and a second contact identifier corresponding to respective matching contact are displayed in the matching interface in a first predefined displaying manner, or the second contact identifier of respective matching contact is displayed in the matching interface in the first predefined displaying manner.

In various examples, a user may control movement of the contact identifier corresponding to the user in the matching interface. The contact identifier corresponding to respective contact may be shown as an avatar, or the contact identifier corresponding to respective contact may have the same image but different text identifiers, e.g., the identifier corresponding to respective contact is a fish image, the text identifier denotes the contact information of the contact, e.g., for a contact "banana brother", the text identifier is "banana brother".

Figure 4:
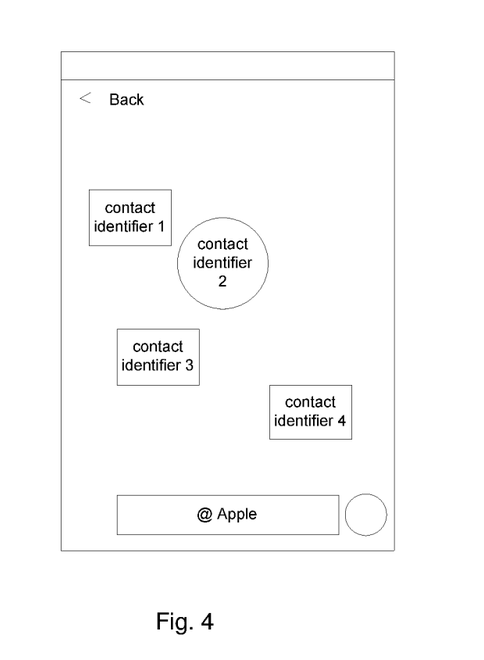
FIG. 4 shows the second contact identifier according to a bubble manner according to various examples of the present disclosure.

The displaying the first contact identifier and the second contact identifier in the predefined displaying manner may include: adding a pattern such as a bubble around the first contact identifier and the second contact identifier, or controlling the first contact identifier and the second contact identifier shining or twinkling, which may be configured according to requirements. It is also possible to display merely the second contact identifier corresponding to the contact matching with the contact waiting for match in the predefined first displaying manner. As shown in FIG. 4, the second contact identifier may be displayed by adding a bubble, e.g., contact identifier 1 is the first contact identifier and contact identifier 2 is the second contact identifier.

According to the contact matching method provided by the present disclosure, a first interest label corresponding to a contact waiting for match in the matching interface and a second interest label corresponding to respective contact other than the contact waiting for match in the matching interface are obtained, the first interest label is compared with the second interest label to obtain a contact matching with the contact waiting for match. Through the matching of the interest labels, it is possible to find a contact matching with the contact waiting for match rapidly and improve the accuracy for contact matching. At the same time, the first contact identifier corresponding to the contact waiting for match and a second contact identifier corresponding to respective matching contact are displayed in a predefined first displaying manner, or the second contact identifier corresponding to respective matching contact is displayed in the predefined first displaying manner, which enables the user to recognize the second contact identifier corresponding to the matching contact matching with the contact waiting for match and improves a matching efficiency.

Figure 5A:
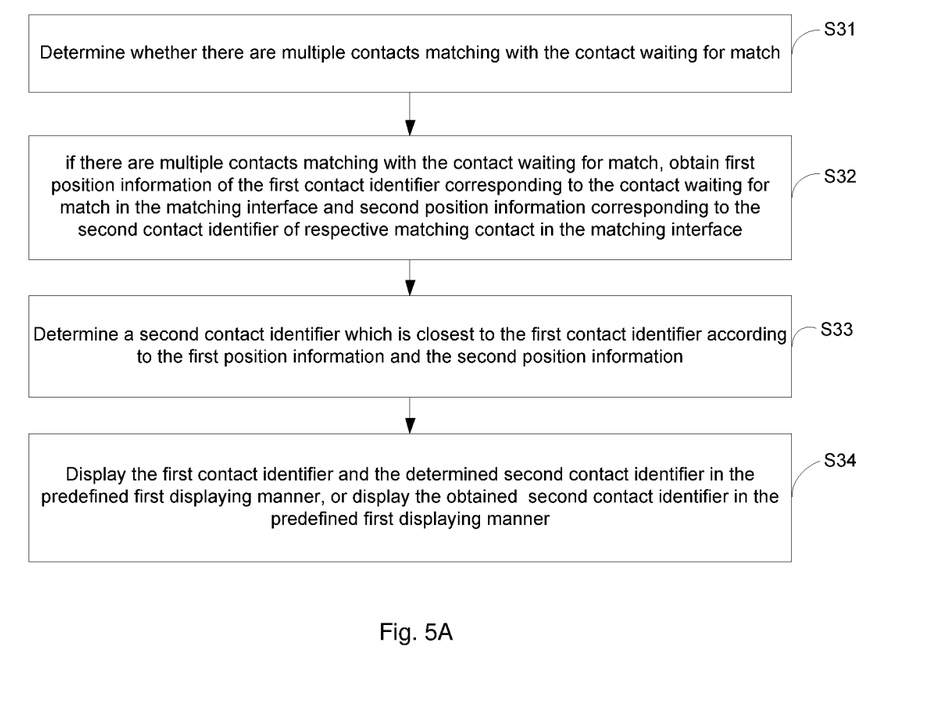
FIG. 5A is a flowchart illustrating an implementation of block S30 in FIG. 1 according to various examples of the present disclosure.

Further, based on the above contact matching method provided by the examples of the present disclosure, in some examples of the present disclosure, as shown in FIG. 5A, an implementation of block S30 may include the following.

In block S31, it is determined whether there are multiple contacts matching with the contact waiting for match.

In block S32, if there are multiple contacts matching with the contact waiting for match, first position information of the first contact identifier corresponding to the contact waiting for match in the matching interface and second position information corresponding to the second contact identifier of respective matching contact in the matching interface are obtained.

In some examples, the contact identifier of respective contact may be moved in the matching interface. For example, if the user wants to chat with a contact, he may control his contact identifier to be closer to the contact identifier of that contact. The first position information of the first contact identifier in the matching interface and the second position information of the second contact identifier in the matching interface may be respectively coordinate information of the first contact identifier and the second contact identifier in the matching interface. The coordinate information may be determined based on a predefined coordinate system. The coordinate system may be configured based on the matching interface. For example, a center point of the matching interface may be configured as a coordinate origin to generate the coordinate system. Then, the position information of each contact identifier in the matching interface may be determined according to the coordinate system. It should be noted that, other positions of the matching interface may also be configured as the coordinate origin.

In block S33, a second contact identifier which is closest to the first contact identifier is determined according to the first position information and the second position information.

Based on the second position information corresponding to respective second contact identifier and the first position information corresponding to the contact waiting for match, a distance between respective second contact identifier and the first contact identifier is determined, the distance may be calculated based on a conventional calculation manner for calculating distance between two points and is not repeated herein. It is possible to sort the distances to determine the second contact identifier closest to the first contact identifier. The second contact identifier which is closest to the first contact identifier is the second contact identifier having the shortest distance from the first contact identifier.

In block S34, the first contact identifier and the second contact identifier determined in block S33 are displayed in the predefined first displaying manner, or the second contact identifier obtained in block S33 is displayed in the predefined first displaying manner.

It should be noted that, if there is only one contact matching with the contact waiting for match, the first contact identifier and the second contact identifier corresponding to the contact matching with the contact waiting for match may be displayed in the predefined first displaying manner, or the second contact identifier corresponding to the contact matching with the contact waiting for match may be displayed in the predefined first displaying manner.

It should be noted that, if there are multiple second contact identifiers which are all close to the first contact identifier, the first contact identifier and all of the second contact identifiers may be displayed in the predefined first displaying manner, or the second contact identifiers may be displayed in the predefined first displaying manner.

Figure 5B:
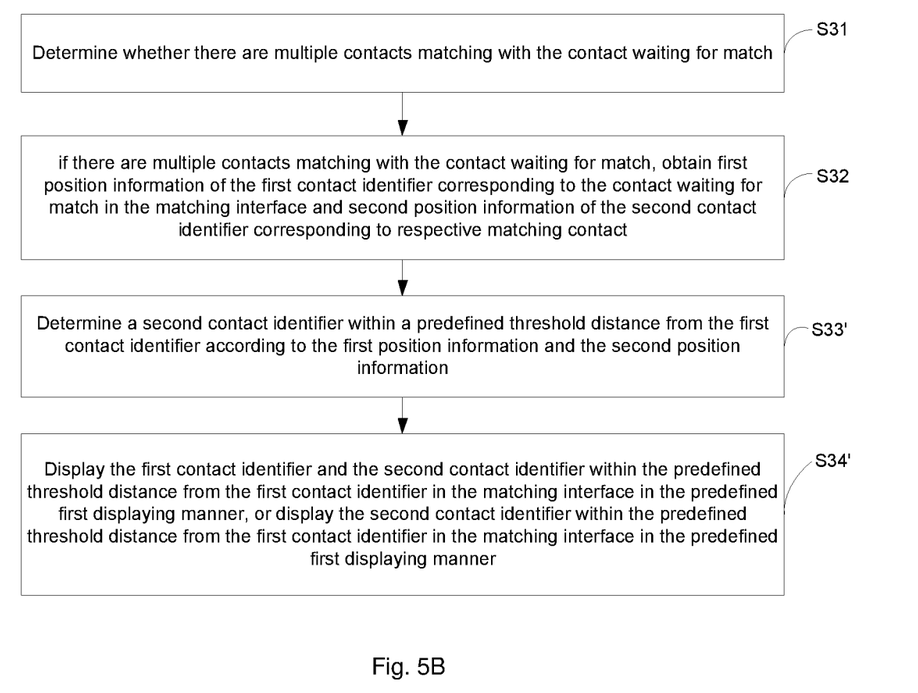
FIG. 5B is a flowchart illustrating another implementation of block S30 in FIG. 1 according to various examples of the present disclosure.

As shown in FIG. 5B, another implementation of block S30 includes the following.

In block S31, it is determined whether there are multiple contacts matching with the contact waiting for match.

In block S32, if there are multiple contacts matching with the contact waiting for match, first position information of the first contact identifier corresponding to the contact waiting for match in the matching interface and second position information of the second contact identifier corresponding to respective matching contact are obtained.

In block S33', a second contact identifier within a predefined threshold distance from the first contact identifier is determined according to the first position information and the second position information.

In block S34', the first contact identifier and the second contact identifier within the predefined threshold distance from the first contact identifier are displayed in the matching interface in the predefined first displaying manner, or the second contact identifier within the predefined threshold distance from the first contact identifier is displayed in the matching interface in the predefined first displaying manner.

In some examples, if there are multiple contacts matching with the contact waiting for match, it is possible to highlight respective second contact identifier closer to the first contact identifier corresponding to the contact waiting for match, so as to increase matching efficiency.

Figure 6:
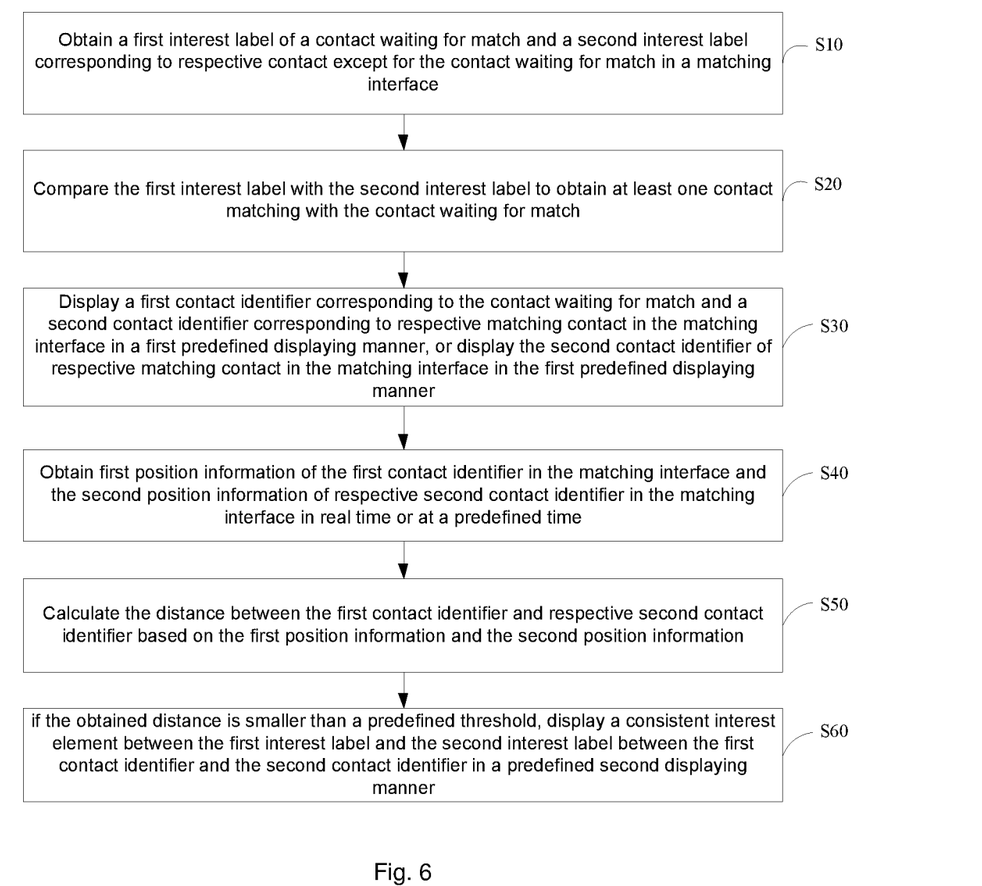
FIG. 6 is a flowchart illustrating another contact matching method according to various examples of the present disclosure.

Further, based on the above contact matching method provided by the examples of the present disclosure, in some examples, as shown in FIG. 6, the method may further include the following after block S30.

In block S40, first position information of the first contact identifier in the matching interface and the second position information of respective second contact identifier in the matching interface are obtained in real time or at a predefined time.

In block S50, the distance between the first contact identifier and respective second contact identifier is calculated based on the first position information and the second position information.

In block S60, if the obtained distance is smaller than a predefined threshold, a consistent interest element between the first interest label and the second interest label is displayed between the first contact identifier and the second contact identifier in a predefined second displaying manner.

Figure 7:
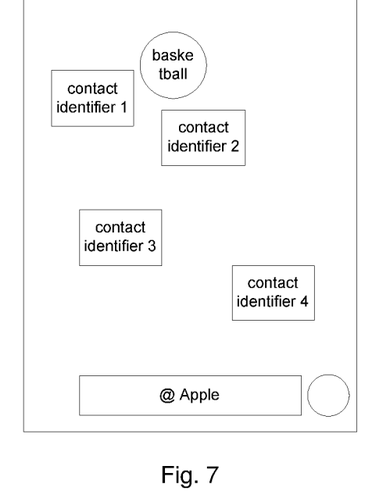
FIG. 7 shows a consistent interest element between the first contact identifier and the second contact identifier.

In some examples, the consistent interest element displayed between the first contact identifier and the second contact identifier may be as shown in FIG. 7. The first contact identifier is contact identifier 1, the second contact identifier is contact identifier 2, and the consistent interest element basketball is displayed when the first contact identifier and the second contact identifier are close to each other.

In the solution provided by the examples of the present disclosure, through displaying the consistent interest element when the first contact identifier and the second contact identifier are close to each other, the user is able to start a topic rapidly and functions are enriched.

Figure 8:
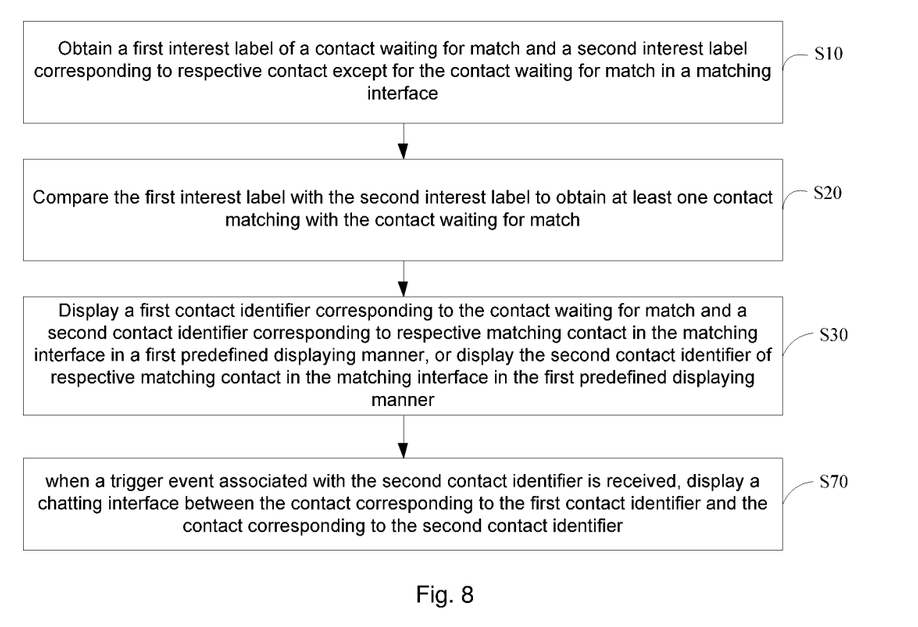
FIG. 8 is a flowchart illustrating another contact matching method according to various examples of the present disclosure.

Further, based on the above contact matching method provided by the examples of the present disclosure, in another example of the present disclosure, as shown in FIG. 8, the method further includes the following after block S30.

In block S70, when a trigger event associated with the second contact identifier is received, a chatting interface between the contact corresponding to the first contact identifier and the contact corresponding to the second contact identifier is displayed.

It should be noted that, block S70 may be executed in parallel with block S40, or between blocks S40-S70, or before block S40 or after block S70, which is relevant to the time that the trigger event happens.

Each interest element in the second interest label corresponding to the second contact identifier may be displayed in the chatting interface. Or, it is possible to display the interest element in the second interest label corresponding to the second contact identifier that is consistent with first interest label. As such, the user may chat based on the interest, which is very convenient.

Figure 9:
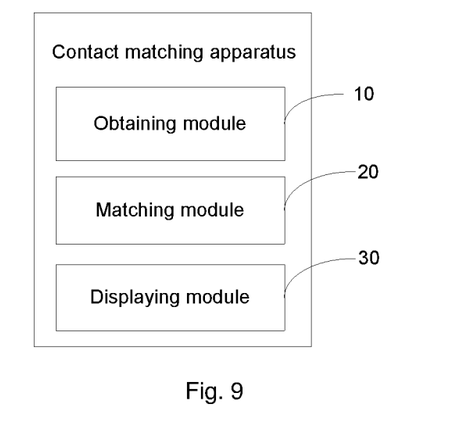
FIG. 9 is a schematic diagram illustrating functional modules of a contact matching apparatus according to various examples of the present disclosure.

Accordingly, examples of the present disclosure provide a contact matching apparatus. As shown in FIG. 9, the contact matching apparatus includes an obtaining module 10, a matching module 20 and a displaying module 30.

The obtaining module 10 is to obtain a first interest label corresponding to a contact waiting for match and a second interest label corresponding to respective contact except for the contact waiting for match in a matching interface.

In some examples, the user may input its interest label in an interest label input interface. The interest element(s) in the interest label may be directly input by the user or selected from various keywords. For example, the interest label corresponding to the contact waiting for match includes basketball, climbing and badminton. The interest label may also be configured when the user applies for an account of the instant messaging application or the social networking application.

The contact waiting for match may be a contact triggering a matching instruction. Or, when a contact identifier corresponding to a contact enters into the matching interface, the contact may be determined as the contact waiting for match. It should be noted that, the contact waiting for match is not restricted to be obtained via the above two manners. It is also possible to determine a contact as the contact waiting for match when a contact identifier corresponding to the contact enters an area of the matching interface. The interest label corresponding to each contact is saved in association with the contact information, e.g., the interest label corresponding to each contact may be obtained according to a mapping relationship between the interest label and the contact information.

The matching module 20 is to compare the first interest label and the second interest label to obtain at least one contact matching with the contact waiting for match.

Figure 10:
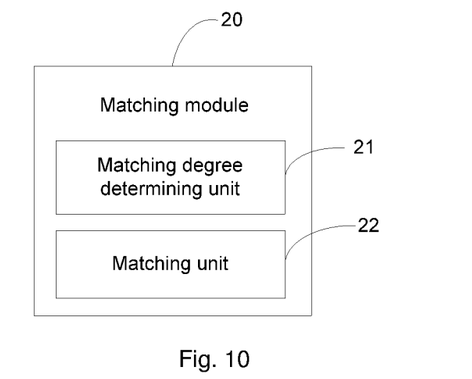
FIG. 10 is a schematic diagram illustrating detailed functional modules of a matching module in FIG. 9 according to various examples of the present disclosure.

In some examples, respective interest element of the first interest label and that of the second interest label may be compared to determine a matching degree. As shown in FIG.

10, in some examples, the matching module 20 may include a matching degree determining unit 21 and a matching unit 22.

The matching degree determining unit 21 is to compare each interest element in the first interest label and that in the second interest label, to determine the matching degree between the first interest label and the second interest label.

In some examples of the present disclosure, the matching degree is a proportion of the number of consistent interest element(s) between the first interest label and the second interest label to the total number of interest element(s) of the first interest label. For example, the number of interest elements of the first interest label is 5, and the number of consistent interest elements between the first interest label and the second interest label is 3. Thus, the matching degree of the second interest label is 60%.

It should be noted that, the matching degree may also be the number of interest elements of the second interest label that are consistent with the first interest label. For example, the number of interest elements of the second interest label that are consistent with the first interest label is 3. Thus, the matching degree corresponding to the second interest label is 3.

The matching unit 22 is to obtain the contact matching with the contact waiting for match based on the matching degree, wherein the matching degree of the second interest label corresponding to the contact matching with the contact waiting for match is higher than a predefined threshold.

The predefined threshold may be defined by a user or may be a default value configured by system. If the matching degree corresponding to the second interest label is higher than the predefined threshold, it is determined that the contact corresponding to the second interest label matches with the contact waiting for match.

The displaying module 30 is to display the first contact identifier corresponding to the contact waiting for match and the second contact identifier corresponding to each matching contact in the matching interface according to the predefined first displaying manner, or to display the second contact identifier corresponding to each matching contact in the matching interface according to the predefined first displaying manner.

In various examples, a user may control movement of the contact identifier corresponding to the user in the matching interface. The contact identifier corresponding to respective contact may be shown as an avatar, or the contact identifier corresponding to respective contact may have the same image but different text identifiers, e.g., the identifier corresponding to respective contact is a fish image, the text identifier denotes the contact information of the contact, e.g., for a contact "banana brother", the text identifier is "banana brother".

The displaying the first contact identifier and the second contact identifier in the predefined displaying manner may include: adding a pattern such as a bubble around the first contact identifier and the second contact identifier, or controlling the first contact identifier and the second contact identifier shining or twinkling, which may be configured according to requirements. It is also possible to display merely the second contact identifier corresponding to the contact matching with the contact waiting for match in the predefined first displaying manner. As shown in FIG. 4, the second contact identifier may be displayed by adding a bubble, e.g., contact identifier 1 is the first contact identifier and contact identifier 2 is the second contact identifier.

According to the contact matching apparatus provided by the present disclosure, a first interest label corresponding to a contact waiting for match in the matching interface and a second interest label corresponding to respective contact other than the contact waiting for match in the matching interface are obtained, the first interest label is compared with the second interest label to obtain a contact matching with the contact waiting for match. Through the matching of the interest labels, it is possible to find a contact matching with the contact waiting for match rapidly and improve the accuracy for contact matching. At the same time, the first contact identifier corresponding to the contact waiting for match and a second contact identifier corresponding to respective matching contact are displayed in a predefined first displaying manner, or the second contact identifier corresponding to respective matching contact is displayed in the predefined first displaying manner, which enables the user to recognize the second contact identifier corresponding to the matching contact matching with the contact waiting for match and improves a matching efficiency.

Figure 11:
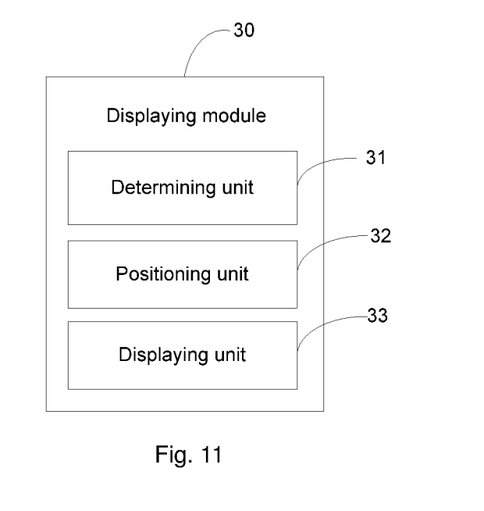
FIG. 11 is a schematic diagram illustrating detailed functional modules of a displaying module in FIG. 9 according to various examples of the present disclosure.

Further, based on the contact matching apparatus provided by the examples of the present disclosure, some examples of the present disclosure provide another displaying module 30, as shown in FIG. 11, the displaying module 30 includes:

a determining unit 31, to determine if there are multiple contacts matching with the contact waiting for match; and a positioning unit 32, to obtain, if there are multiple contacts matching with the contact waiting for match, first position information of the first contact identifier corresponding to the contact waiting for match in the matching interface and the second position information of second contact identifier corresponding to each matching contact in the matching interface.

In some examples, the contact identifier of respective contact may be moved in the matching interface. For example, if the user wants to chat with a contact, he may control his contact identifier to be closer to the contact identifier of that contact. The first position information of the first contact identifier in the matching interface and the second position information of the second contact identifier in the matching interface may be respectively coordinate information of the first contact identifier and the second contact identifier in the matching interface. The coordinate information may be determined based on a predefined coordinate system. The coordinate system may be configured based on the matching interface. For example, a center point of the matching interface may be configured as a coordinate origin to generate the coordinate system. Then, the position information of each contact identifier in the matching interface may be determined according to the coordinate system. It should be noted that, other positions of the matching interface may also be configured as the coordinate origin.

The positioning unit 32 determines a distance between respective second contact identifier and the first contact identifier according to the second position information corresponding to respective second contact identifier and the first position information corresponding to the contact waiting for match. The distance may be calculated according to a conventional method for calculating a distance between two points, which is not repeated herein. The calculated distances may be sorted to determine a second contact identifier closest to the first contact identifier.

The determining unit 31 is further to determine the second contact identifier closest to the first contact identifier according to the first position information and the second position information.

The displaying unit 33 is to display the first contact identifier and the obtained second contact identifier in the predefined first displaying manner, or display the obtained second contact identifier according to the predefined first displaying manner.

It should be noted that, if there is only one contact matching with the contact waiting for match, the displaying unit 33 may display the first contact identifier and the second contact identifier corresponding to the contact matching with the contact waiting for match according to the predefined first displaying manner, or display the second contact identifier corresponding to the contact matching with the contact waiting for match according to the predefined first displaying manner.

It should be noted that, if there are multiple second contact identifiers close to the first contact identifier, the displaying unit 33 may display the first contact identifier and respective second contact identifier according to the predefined first displaying manner, or display respective second contact identifier according to the predefined first displaying manner. The positioning unit 32 is further to obtain, if there are multiple contacts matching with the contact waiting for match, the first position information of the first contact identifier corresponding to the contact waiting for match in the matching interface and second position information of respective second contact identifier corresponding to the matching contact in the matching interface. The determining unit 31 is further to determine the second contact identifier within a predefined threshold distance from the first contact identifier according to the first position information and the second position information. The displaying unit 33 is further to display the first contact identifier and the obtained second contact identifier according to the predefined first displaying manner, or display the obtained second contact identifier according to the predefined first displaying manner.

In some examples, if there are multiple contacts matching with the contact waiting for match, it is possible to display merely the second contact identifiers closer to the first contact identifier corresponding to the contact waiting for match, so as to improve matching efficiency.

Figure 12:
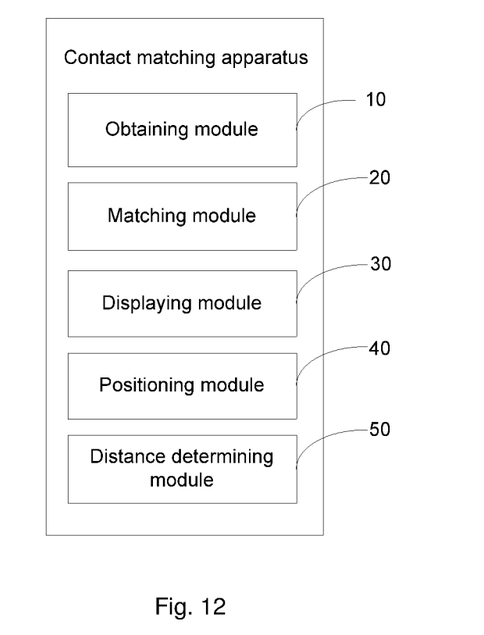
FIG. 12 is a schematic diagram illustrating functional modules of another contact matching apparatus according to various examples of the present disclosure.

Further, based on the above contact matching apparatus provided by the examples of the present disclosure, examples of the present disclosure further provides a contact matching apparatus, as shown in FIG. 12, the contact matching apparatus includes:
- a positioning module 40, to obtain first position information of a first contact identifier in the matching interface and second position information of respective second contact identifier in the matching interface in real time or at predefined time;
- a distance determining module 50, to calculate a distance between the first contact identifier and respective second contact identifier based on the first position information and the second position information; and
- a displaying module 30, to display between the first contact identifier and the second contact identifier, if the distance is smaller than a predefined threshold, a consistent interest element between a first interest label and a second interest label according to the second displaying manner.

In some examples, the consistent interest element displayed between the first contact identifier and the second contact identifier may be as shown in FIG. 7. The first contact identifier is contact identifier 1 and the second contact identifier is contact identifier 2. The consistent interest element between the first contact identifier and the second contact identifier is basketball.

In the solution provided by the examples of the present disclosure, through displaying the consistent interest element when the first contact identifier and the second contact identifier are close, the user is able to find a topic quickly, which improves functions.

Further, based on the examples of the contact matching apparatus, in another example of the present disclosure, the displaying module 30 is further to display a chatting interface between the contact corresponding to the first contact identifier and the contact corresponding to the second contact identifier when receiving a trigger event associated with the second contact identifier.

Each interest element in the second interest label corresponding to the second contact identifier may be displayed in the chatting interface. Or, it is possible to display merely the interest element of the second interest label consistent with the first interest label, such that the users chat according to the interest, which is very convenient.

It should be noted that, in the present disclosure, the terms "include", "comprise" and their derivatives are used in an open-ended fashion, and thus should be interpreted to mean "include, but not limited to . . . ", such that the presence of stated process, method, product or apparatus include a series of elements include those stated elements, but do not preclude other elements not explicitly shown and may further include elements fixedly included in the process, method, product or apparatus.

The serial numbers of the examples are merely used for facilitating the description and do not represent any preference of the examples.

Through the description of the above examples, those with ordinary skill would know that the above examples of the present disclosure may be implemented by software in combination with necessary universal hardware platform or implemented via hardware, but the former is better in most cases. Based on this, the technical solution of the present disclosure in essence or the contribute part of the present disclosure may be embedded as a software product. The software product is stored in a storage medium (e.g. ROM/RAM, disk, compact disk), storing instructions executable by a terminal device (e.g., cell phone, computer, server, or network device, etc.) to implement the method provided by the examples of the present disclosure.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A contact matching method, comprising:
   obtaining, by a client device, a first interest label corresponding to a contact waiting for match and a second interest label corresponding to respective contact other than the contact waiting for match in a matching interface displayed on the client device;
   comparing, by the client device, the first interest label and the second interest label to obtain at least one contact matching with the contact waiting for match;
   displaying, by the client device, a first contact identifier corresponding to the contact waiting for match and a second contact identifier corresponding to respective matching contact or a second contact identifier corresponding to respective matching contact in the matching interface according to a predefined first displaying manner which is different from a displaying manner of contacts not matching with the contact waiting for match;

obtaining first position information of the first contact identifier in the matching interface in real time or at a predefined time;

moving the first contact identifier displayed in the matching interface in response to a movement control operation performed by a user of the client device, wherein the first position information of the first contact identifier is updated based on coordinates of the first contact identifier displayed in the matching interface;

obtaining second position information of the second contact identifier in the matching interface;

calculating a screen distance between the first contact identifier and respective second contact identifier displayed in the matching interface based on the first position information and the second position information in the matching interface; and if the screen distance is smaller than a predefined threshold, displaying a consistent interest element between the first interest label and the second interest label between the first contact identifier and the second contact identifier according to a predefined second displaying manner.

2. The method of claim 1, wherein the displaying the first contact identifier corresponding to the contact waiting for match and the second contact identifier corresponding to respective matching contact in the matching interface according to the predefined first displaying manner comprises:

determining whether there are multiple contacts matching with the contact waiting for match;

if there are multiple contacts matching with the contact waiting for match, obtaining first position information of the first contact identifier corresponding to the contact waiting for match in the matching interface, and obtaining second position information of the second contact identifier corresponding to respective matching contact in the matching interface;

determining the second contact identifier closest to the first contact identifier according to the first position information and the second position information; and displaying the first contact identifier and the second contact identifier closest to the first contact identifier in the matching interface according to the predefined first displaying manner.

3. The method of claim 1, wherein the displaying the first contact identifier corresponding to the contact waiting for match and the second contact identifier corresponding to respective matching contact in the matching interface according to the predefined first displaying manner comprises:

determining whether there are multiple contacts matching with the contact waiting for match;

if there are multiple contacts matching with the contact waiting for match, obtaining first position information of the first contact identifier corresponding to the contact waiting for match in the matching interface, and obtaining second position information of the second contact identifier corresponding to respective matching contact in the matching interface;

determining the second contact identifier within a predefined threshold distance from the first contact identifier according to the first position information and the second position information;

displaying the first contact identifier and the second contact identifier within the predefined threshold distance from the first contact identifier or the second contact identifier within the predefined threshold distance from the first contact identifier in the matching interface according to the predefined first displaying manner.

4. The method of claim 1, wherein after displaying the first contact identifier corresponding to the contact waiting for match and the second contact identifier corresponding to respective matching contact or the second contact identifier corresponding to respective matching contact in the matching interface according to the predefined first displaying manner, the method further comprising:

when receiving a trigger event associated with the second contact identifier, displaying a chatting interface between the contact waiting for match corresponding to the first contact identifier and the matching contact corresponding to the second contact identifier.

5. The method of claim 1, wherein the comparing the first interest label and the second interest label to obtain the contact matching with the contact waiting for match comprises:

comparing respective interest element in the first interest label with respective interest element in the second interest label to determine a matching degree between the first interest label and the second interest label; and obtaining the contact matching with the contact waiting for match according to the matching degree; wherein the matching degree of the second interest label corresponding to the matching contact matching with the contact waiting for match is higher than a predefined threshold.

6. The method of claim 1, wherein before obtaining the first interest label corresponding to the contact waiting for match and the second interest label corresponding to respective other contact except for the contact waiting for match in the matching interface, the method further comprising:

determining the contact waiting for match; and the determining the contact waiting for match comprises:
determining a contact triggering a matching instruction as the contact waiting for match; or, determining the contact whose contact identifier entering into the matching interface as the contact waiting for match; or determining the contact whose contact identifier entering into a predefined area in the matching interface as the contact waiting for match.

7. A contact matching apparatus comprising a processor and memory storing instructions that, when executed by the processor, cause the processor to:

obtain a first interest label corresponding to a contact waiting for match and a second interest label corresponding to respective contact except for the contact waiting for match in a matching interface displayed on a client device;

compare the obtained first interest label and the second interest label to obtain at least one contact matching with the contact waiting for match;

display a first contact identifier corresponding to the contact waiting for match and a second contact identifier corresponding to respective matching contact or a second contact identifier corresponding to respective matching contact in the matching interface according to a predefined first displaying manner which is different from a displaying manner of contacts not matching with the contact waiting for match;

obtain in real time or at a predetermined time first position information of the first contact identifier in the matching interface;

move the first contact identifier displayed in the matching interface in response to a movement control operation performed by a user of the client device, wherein the first position information of the first contact identifier is updated based on coordinates of the first contact identifier displayed in the matching interface;

obtain second position information of the second contact identifier in the matching interface;

determine a screen distance between the first contact identifier and respective second contact identifier displayed in the matching interface according to the first position information and the second position information in the matching interface; and display, between the first contact identifier and the second contact identifier, a consistent interest element between the first interest label and the second interest label in a predefined second displaying manner when the screen distance is smaller than a predefined threshold.

8. The apparatus of claim 7, wherein the instructions that cause the processor to display a first contact identifier further cause the processor to:

determine whether there are multiple contacts matching with the contact waiting for match;

obtain, when there are multiple contacts matching with the contact waiting for match, first position information of the first contact identifier corresponding to the contact waiting for match in the matching interface and second position information of the second contact identifier corresponding to respective matching contact in the matching interface;

determine a second contact identifier closest to the first contact identifier according to the first position information and the second position information; and display a first contact identifier corresponding to the contact waiting for match and a second contact identifier corresponding to respective matching contact or a second contact identifier corresponding to respective matching contact in the matching interface according to a predefined first displaying manner.

9. The apparatus of claim 7, wherein the instructions that cause the processor to display a first contact identifier further cause the processor to:

determine whether there are multiple contacts matching with the contact waiting for match;

obtain, when there are multiple contacts matching with the contact waiting for match, first position information of the first contact identifier corresponding to the contact waiting for match in the matching interface and second position information of the second contact identifier corresponding to respective matching contact in the matching interface;

determine a second identifier within a predefined threshold distance from the first contact identifier according to the first position information and the second position information; and display the first contact identifier corresponding to the contact waiting for match and the second contact identifier corresponding to respective matching contact or the second contact identifier corresponding to respective matching contact in the matching interface according to a predefined first displaying manner.

10. The apparatus of claim 7, wherein the instructions that cause the processor to display a first contact identifier further cause the processor to display, when receiving a trigger event associated with the second contact identifier, a chatting interface between the contact waiting for match corresponding to the first contact identifier and the matching contact corresponding to the second contact identifier.

11. The apparatus of claim 7, wherein the instructions that cause the processor to compare the obtained first interest label and the second interest label further cause the processor to:

compare respective interest element in the first interest label with respective interest element in the second interest label to determine a matching degree between the first interest label and the second interest label; and obtain a contact matching with the contact waiting for match according to the matching degree, wherein the matching degree of the second interest label corresponding to the contact matching with the contact waiting for match is higher than a predefined threshold.

12. The apparatus of claim 7, wherein the instructions that cause the processor to obtain a first interest label further cause the processor to determine a contact triggering a matching instruction as the contact waiting for match; or determine a contact whose contact identifier entering into the matching interface as the contact waiting for match; or determine a contact whose contact identifier entering into a predefined area of the matching interface as the contact waiting for match.

13. A non-transitory computer readable storage medium, comprising machine readable instructions executable by a processor to perform acts of:

obtaining a first interest label corresponding to a contact waiting for match and a second interest label corresponding to respective contact other than the contact waiting for match in a matching interface displayed on the client device;

comparing the first interest label and the second interest label to obtain at least one contact matching with the contact waiting for match;

displaying a first contact identifier corresponding to the contact waiting for match and a second contact identifier corresponding to respective matching contact or a second contact identifier corresponding to respective matching contact in the matching interface according to a predefined first displaying manner which is different from a displaying manner of contacts not matching with the contact waiting for match;

obtaining first position information of the first contact identifier in the matching interface in real time or at a predefined time;

moving the first contact identifier displayed in the matching interface in response to a movement control operation performed by a user of the client device, wherein the first position information of the first contact identifier is updated based on coordinates of the first contact identifier displayed in the matching interface;

obtaining second position information of the second contact identifier in the matching interface;

calculating a screen distance between the first contact identifier and respective second contact identifier displayed in the matching interface based on the first position information and the second position information in the matching interface; and if the screen distance is smaller than a predefined threshold, displaying a consistent interest element between the first interest label and the second interest label between the first contact identifier and the second contact identifier according to a predefined second displaying manner.

\* \* \* \* \*